US008934402B2

(12) United States Patent
Gineste

(10) Patent No.: US 8,934,402 B2
(45) Date of Patent: Jan. 13, 2015

(54) METHOD FOR THE OPTIMIZED ALLOCATION OF A SATELLITE COMMUNICATION RESOURCE AND ASSOCIATED COMMUNICATION SYSTEM

(75) Inventor: Mathieu Gineste, Toulouse (FR)

(73) Assignee: Thales, Neuilly sur Seine (FR)

( * ) Notice: Subject to any disclaimer, the term of this patent is extended or adjusted under 35 U.S.C. 154(b) by 254 days.

(21) Appl. No.: 13/581,405

(22) PCT Filed: Feb. 9, 2011

(86) PCT No.: PCT/EP2011/051852

§ 371 (c)(1), (2), (4) Date: Oct. 5, 2012

(87) PCT Pub. No.: WO2011/104114

PCT Pub. Date: Sep. 1, 2011

(65) Prior Publication Data

US 2013/0136054 A1 May 30, 2013

(30) Foreign Application Priority Data

Feb. 26, 2010 (FR) ..................................... 10 00804

(51) Int. Cl.
*H04B 7/185* (2006.01)
*H04W 72/04* (2009.01)

(52) U.S. Cl.
CPC ....... *H04W 72/0446* (2013.01); *H04B 7/18513* (2013.01); *H04B 7/18578* (2013.01); *H04B 7/18534* (2013.01); *H04B 7/18528* (2013.01); *H04B 7/18506* (2013.01)
USPC ........................................................... 370/316

(58) Field of Classification Search
None
See application file for complete search history.

(56) References Cited

U.S. PATENT DOCUMENTS

| | | | | |
|---|---|---|---|---|
| 6,374,405 | B1 * | 4/2002 | Willard | 725/94 |
| 6,487,183 | B1 * | 11/2002 | Lo et al. | 370/326 |
| 8,176,520 | B1 * | 5/2012 | Mitchell | 725/76 |
| 2003/0045285 | A1 | 3/2003 | Parkman | |
| 2003/0152110 | A1 * | 8/2003 | Rune | 370/509 |
| 2004/0076147 | A1 | 4/2004 | Loge et al. | |
| 2007/0255850 | A1 | 11/2007 | Gould et al. | |
| 2008/0298299 | A1 * | 12/2008 | Thesling | 370/316 |

FOREIGN PATENT DOCUMENTS

WO 2009/065958 A1 5/2009

* cited by examiner

*Primary Examiner* — Kibrom T Hailu
(74) *Attorney, Agent, or Firm* — Baker & Hostetler LLP

(57) ABSTRACT

A method for the time allocation of a satellite communication resource and an associated communication system. The method includes transmitting, by the terminal, a request indicating the time of input of a message into the system and its time requirement, and allocating the communication resource to the message, by performing a processing of the requests by a message scheduling calculation taking into account the time of input of the message into the system and its time requirement.

11 Claims, 5 Drawing Sheets

METHOD FOR THE OPTIMIZED ALLOCATION OF A SATELLITE COMMUNICATION RESOURCE AND ASSOCIATED COMMUNICATION SYSTEM

CROSS-REFERENCE TO RELATED APPLICATIONS

This application is a National Stage of International patent application PCT/EP2011/051852, filed on Feb. 9, 2011, which claims priority to foreign French patent application No. FR 10 00804, filed on Feb. 26, 2010, the disclosures of each of which are incorporated by reference in their entireties.

FIELD OF THE DISCLOSED SUBJECT MATTER

The invention relates to aeronautical communications and, more particularly, air traffic management.

BACKGROUND

FIG. 1 presents an aeronautical communication system for communicating between aircraft 11.1, 11.2, 11.3, 11.4 and a ground unit 12. The system uses a satellite communication resource, called return channel resource, enabling messages to be transmitted from the aircraft 11.1, 11.2, 11.3, 11.4 to the ground unit 12. Each of the aircraft 11.1, 11.2, 11.3, 11.4 includes embedded applications and a terminal for communicating with the ground unit. The messages sent by the aircraft are associated with services. Among those that can be cited, there are, for example: the COTRAC (Common Trajectory Coordination) service which enables the pilot and the air traffic controller to coordinate the trajectory of the aircraft in real time. A message of a service which has a certain size is associated with a priority and a communication network end-to-end delay requirement.

The network formed by the aircraft and the ground unit is managed by a Network Control Center (NCC) 13 responsible for sharing the satellite communication resource between the aircraft (the number of which may be greater than several thousand).

The ground unit transmits the messages to a terrestrial network 15 linking Airline Operation Control (AOC) centers 16.1 and air traffic controllers 17.1, connected to the air traffic management network via Air Navigation Service Providers (ANSP) 17.2.

The traffic profiles used in the aeronautical communications for the air traffic management have very specific characteristics. The first characteristic is that the messages transmitted by the aircraft are very sporadic. The frequency of transmissions of messages by the aircraft is in fact very low. The second characteristic is that there are very strict time constraints to be observed for the messages of a service. For example, the routing delay from end to end in the network must be observed by 95% of the messages.

The control centers according to the prior art do not take these time constraints into account. This is because, even with fairly low traffic loads involving few aircraft, temporary traffic peaks may occur. This can therefore lead to a failure to observe the time constraints, particularly for the longest messages.

Centralized allocation methods are known which allow multiple access to a resource in a telecommunication context, taking into account the constraints of the services. These methods rely on an assumption of a more or less sustained traffic flow and cannot, for the most part, be applied to the context of aeronautical communications. By using the methods applicable to communications for air traffic management, it is found that, even with an average communication bit rate well below the capacity of the resource, some services fail to observe their time requirements.

So-called random allocation methods are also known which allow multiple access to a resource and do not require any prior reservation or centralized management of the resource. The advantage of this type of access is that it is easy to implement and allows immediate access to the resource, in the case where there is no collision between the message fragments transmitted by different terminals. Otherwise, retransmissions of these fragments are necessary. It will therefore be understood that this type of access does not make it possible to guarantee strong time requirements, particularly for long messages for which the probability of collision of one of the fragments is high.

SUMMARY

The invention aims to mitigate the abovementioned problems by proposing a method for the time allocation of a satellite communication resource and an associated system making it possible to reduce the number of messages delivered outside of their time constraint.

The invention can also be applied to other fields, having similar characteristics and including communications of a critical nature involving strict time constraints.

To this end, the subject of the invention is a method for the optimized allocation of a communication resource making it possible to transmit messages from first units to a second unit, each of the first units including embedded applications and a terminal for communicating with the ground unit, a message being associated with a delay requirement and a size, the method being characterized in that it comprises the following steps:

the reception, by the terminal, of messages originating from the embedded applications and, for each message, the storage of a time reference indicating the time of reception of the message by the terminal, the transmission, by the terminal, of a capacity request for at least one message, the request indicating the size of the message, the delay requirement associated with the message (information that may be implicit or explicit in the request) and the time reference of the message, the reception, by a control center of the communication resource, of the capacity request, the allocation of the communication resource to the terminals of the first units, by performing a message scheduling calculation by taking into account the time reference and the delay requirement of the messages, the broadcasting, to the terminals of the first units, of an allocation plan determined on the basis of the calculated scheduling.

The invention makes it possible to take better account of the characteristics of each of the messages by including in the capacity request, the time of input of the message into the system and the type of service associated with the message, indicating its time requirement.

By performing an appropriate allocation of the resource, the invention makes it possible to reduce the number of messages delivered outside of their time constraint and therefore to observe the time requirements linked to the air traffic management services.

By optimizing the allocation of the communication resource, the invention also has the advantage of not having to increase the capacity of this resource to improve the observance of the time requirements.

Against all expectations, the increase in traffic generated by the increase in the request size does not lead to any saturation of the network. On the contrary the transmission of this information which is useful for the allocation of the communication resource makes it possible to improve the traffic on the network and to observe the time requirements of the services.

BRIEF DESCRIPTION OF THE DRAWINGS

The invention will be better understood and other advantages will become apparent on reading the detailed description given as a nonlimiting example and with the help of the figures in which.

DETAILED DESCRIPTION

The invention relates to a method for the optimized allocation of a communication resource, with respect to time constraints, enabling messages to be transmitted from first units to a second unit. Each of the first units includes embedded applications and a terminal for communicating with the second unit, a message being associated with a priority, a delay requirement and a size. A terminal is a means that makes it possible to set up a communication between a first unit and the second unit via the communication resource. The term delay is used to mean the end-to-end delay in the communication network.

Hereinafter in the description, the invention is illustrated on the basis of the nonlimiting example of applications in which: the communication resource is a satellite communication resource, the first units are aircraft and the second unit is a ground unit.

Figure 1:
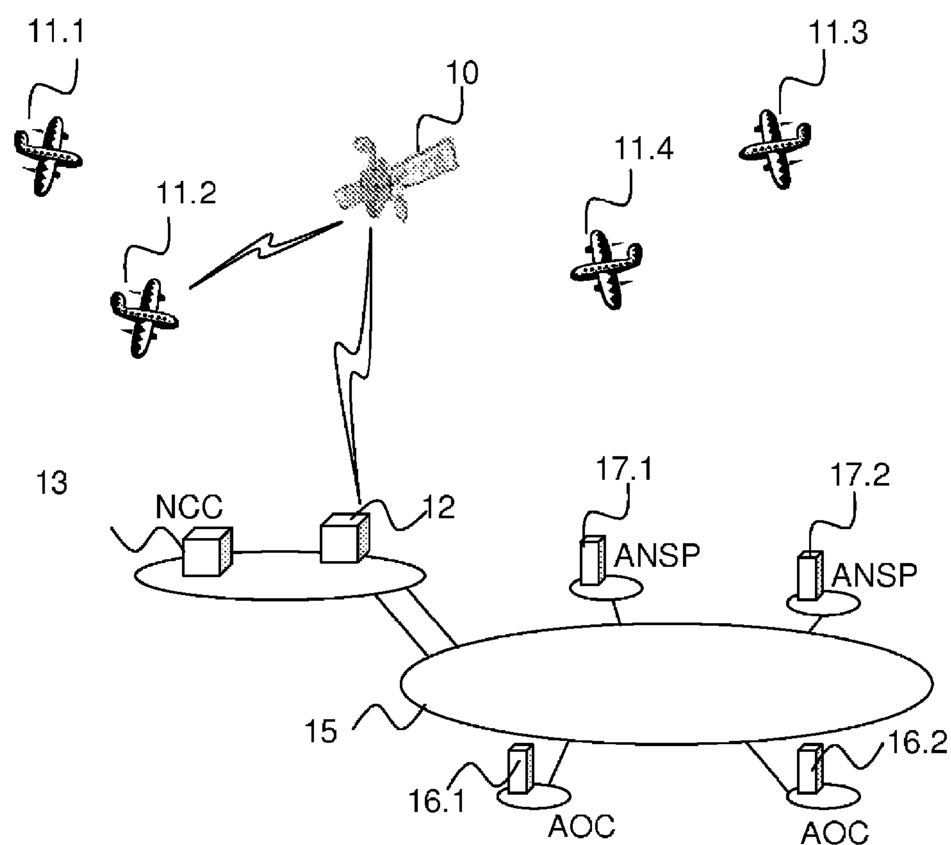
FIG. 1, already described, represents a communication system according to the prior art.
Figure 2:
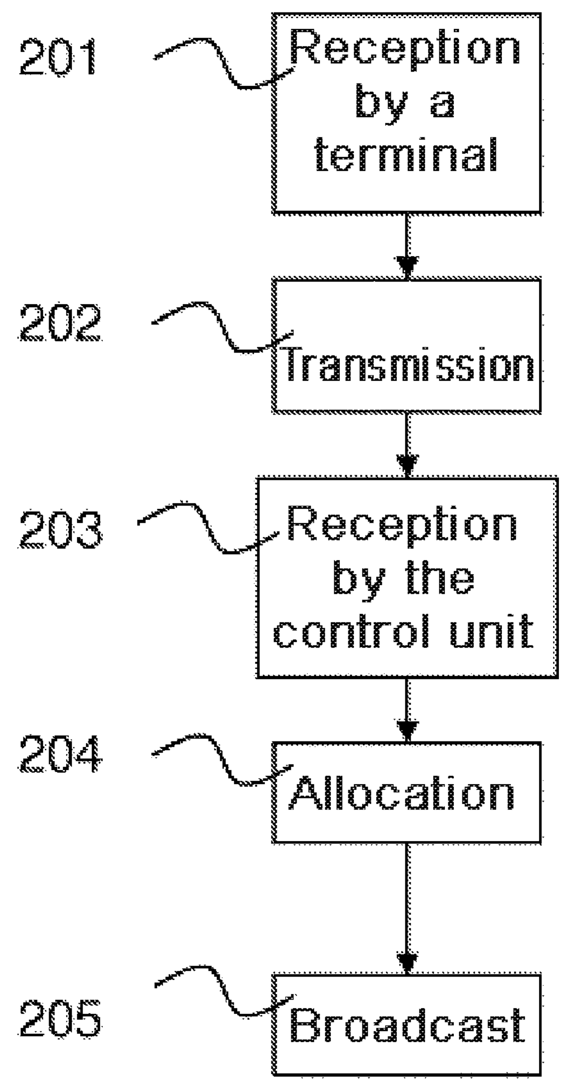
FIG. 2 represents a flow diagram of the method for the time allocation of a communication resource according to the invention.

FIG. 2 represents a flow diagram of the method for the time allocation of a communication resource according to the invention. The method according to the invention comprises the following steps:

The reception 201, by the terminal, of messages originating from the embedded applications and, for each message, the storage of a time reference indicating the time of reception of the message by the terminal. A terminal includes at least one queue for receiving the messages. Each time a message arrives in a queue, a time reference is recorded.

The transmission 202, by the terminal, of a capacity request for at least one message, the request indicating the size of the message, the end-to-end delay requirement in the communication network associated with the message, the time reference of the message and, where appropriate, a priority associated with the message. In practice, the capacity request may contain information of the service type associated with the message. The service then indicates the priority and the delay requirement of the message implicitly. Before transmitting the message by using the satellite resource, it is necessary to make a reservation of this resource through a capacity request. This capacity request comprises the main characteristics of the message. The request is intended for the control center 13 responsible for sharing the resource between the aircraft.

The reception 203, by the control center 13 of the communication resource, of the capacity request.

The allocation 204 of the communication resource to the terminals of the first units, by performing a message scheduling calculation by taking into account the time reference and the delay requirement associated with the messages.

The broadcasting 205, to the terminals of the aircraft, of an allocation plan determined on the basis of the calculated message scheduling.

In practice, the control center 13 continuously receives capacity requests originating from the different aircraft. At regular intervals, it calculates a scheduling of the different messages. Then, an allocation plan is determined on the basis of this scheduling. The allocation plan defines which terminal has the right to transmit on the communication resource for a given time band. The scheduling and the allocation plan are recalculated, for example, every second by taking into account the new capacity requests.

According to a first variant embodiment, the method according to the invention also includes a step for calculating, for each message, a latest reception time. The latest reception time of a message is equal to its time of reception by the terminal plus its delay requirement. The time of reception by the terminal is determined using the stored time reference. In the scheduling calculation, the messages are scheduled in ascending order of latest reception time. This first strategy aims to schedule earliest the messages for which the reception limit times are the closest.

According to a second variant embodiment, the method according to the invention also includes the calculation of a minimum time to transmit a message by the terminal based on the size of the message. This message transmission time is taken into account for the scheduling, it may, for example, be subtracted from the latest reception time of a message as calculated previously. In this case, in the scheduling calculation, the messages are scheduled in ascending order of latest reception time minus the message transmission time.

According to a variant of the invention, each message being associated with a priority, the capacity request indicates priority information associated with the message (explicitly or implicitly), the step 204 of allocating the communication resource to the terminals also including a processing of the requests in order of priority of the associated messages, the scheduling calculation being performed for the messages of equal priority. This variant has the advantage of prioritizing the highest priority messages, independently of the time requirements, while taking into account these time requirements for the messages that have an identical priority.

According to a variant of the invention, the capacity requests are transmitted according to a so-called random mode, that is to say without prior reservation of the communication resource.

This operating mode has the advantage of being easy to implement. However, it presents a risk of collisions between several capacity requests. Since these requests are relatively infrequent, the risk of collisions is fairly low. Moreover, this operating mode does not require any centralized management means regarding the allocation of the requests.

According to another variant of the invention, the capacity requests are transmitted in a dedicated time slot, each of the aircraft having its own time slot dedicated to the transmission of a capacity request.

According to a variant of the invention, the time reference is expressed in the form of an absolute time. This variant has the advantage of being easy to implement. This is because all the terminals of the aircraft are already synchronized with the control center to be able to adhere to the calculated allocation plan. However, the time expressed in an absolute manner may require a significant quantity of communication resource in order to be transmitted.

According to another variant of the invention, the time reference is expressed in the form of a relative time. This variant makes it possible to transmit a time more economically in terms of communication resource.

Figure 3:
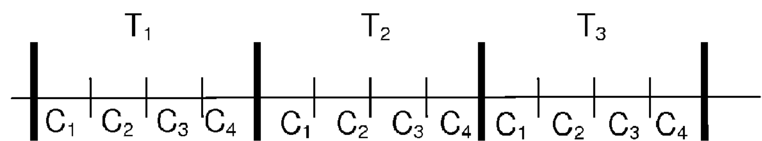
FIG. 3 presents an example of temporal subdivision into frames and time slots.

In order to be able to easily share the communication resource between the aircraft, said resource is subdivided in time into frames identified by numbers. Each frame is also subdivided in time into slots (or time slots) identified by numbers. FIG. 3 presents an example of the temporal subdivision into frames and into slots. The figure presents three frames T1, T2, T3 each comprising four slots C1, C2, C3, C4.

Advantageously, the relative time is expressed in the form of a frame number and a slot number. The control center and all the aircraft terminals share the same frame and slot numbering. This time reference therefore has the advantage of being implicitly synchronized.

Figure 4:
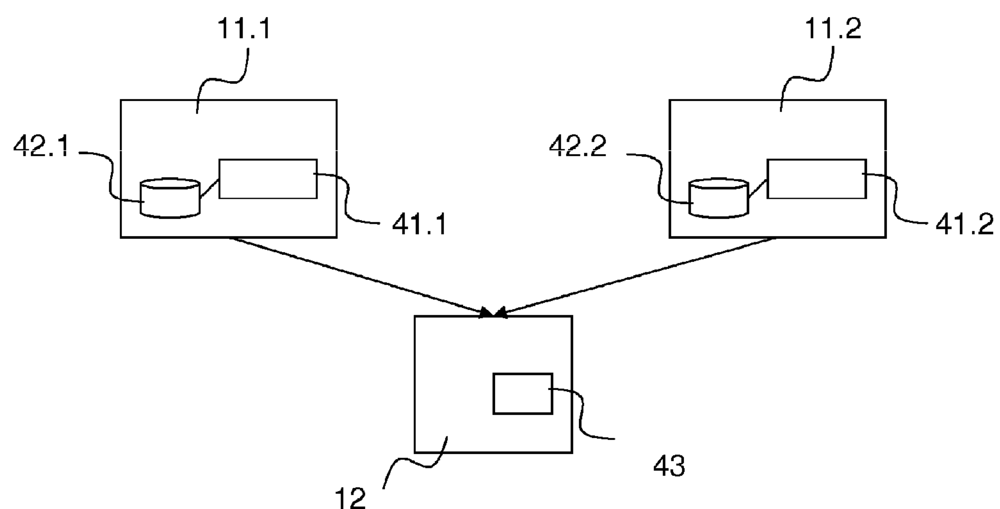
FIG. 4 represents a communication system according to the invention.

The invention also relates to a communication system for communicating between aircraft and a ground unit using a satellite communication resource making it possible to transmit messages from the aircraft to the ground unit. FIG. 4 represents a communication system according to the invention. Each of the aircraft 11.1, 11.2 includes embedded applications and a terminal 41.1, 41.2 for communicating with the ground unit. A message is associated with a priority, a delay requirement and a size.

The terminals 41.1, 41.2 of the aircraft include means for storing 42.1, 42.2 a time reference associated with the messages received.

The control center 13 includes calculation means 43 for calculating an allocation plan according to the priorities, the delay requirements and the time references associated with the messages. These calculation means 43 comprise: means for processing requests in order of priority and means for calculating a scheduling of the messages having identical priorities by taking into account the time reference and the delay requirement of the messages.

Just like the method, the system according to the invention can also be applied to other fields, having similar characteristics and including communications of a critical nature involving strict time constraints.

Figure 5A:
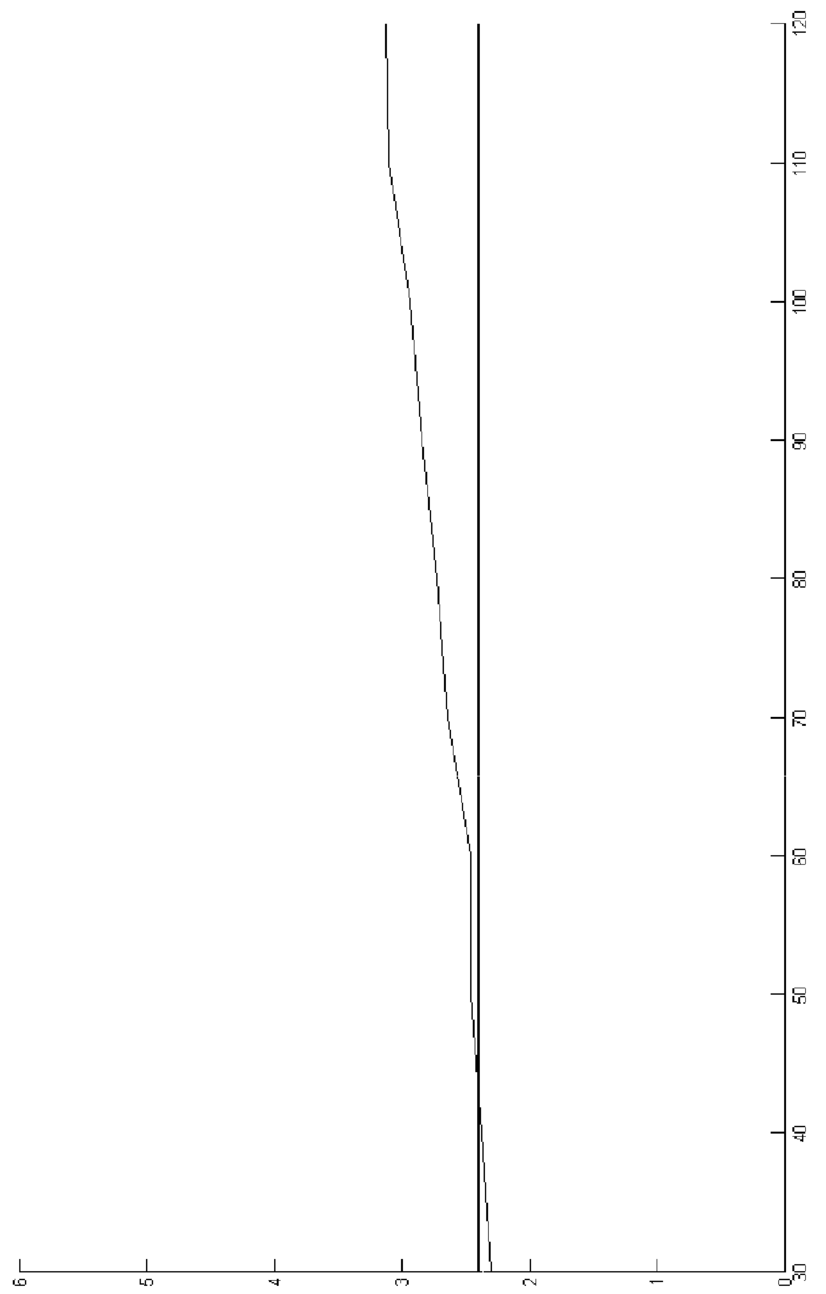
FIGS. 5*a* and 5*b* respectively present results of simulations by applying a first and a second allocation method.
Figure 5B:
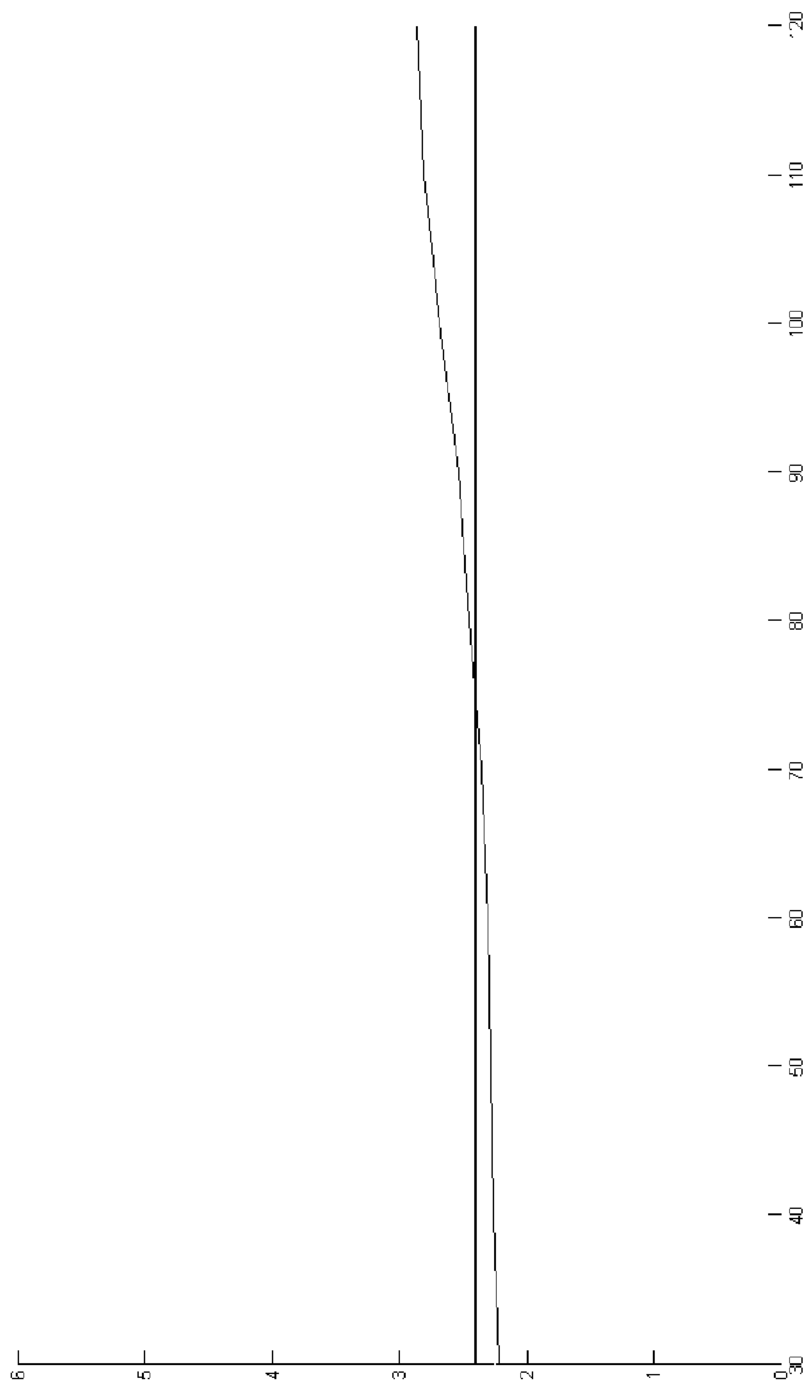

FIGS. 5*a* and 5*b* respectively present results of simulations by applying a first and a second allocation method. The x axis represents the number of aircraft in the simulations and the y axes the transmission times for ninety-five percent of the messages. The curve represents the transmission times for ninety-five percent of the messages of a service (COTRAC service in the example) as a function of the number of aircraft using the resource. A horizontal line indicates the delay requirement associated with the service (2.4 seconds). Logically, the greater the number of aircraft, the longer the message processing delays.

The first method consists in applying a proportional allocation of the resource between all the aircraft. The requests are processed in order of priority and all the requests of one and the same priority are dealt with equally.

By applying this first method, it is found that the time requirements of the services are observed up to forty aircraft. Beyond this number, they are no longer observed.

The second method corresponds to the method according to the invention. It is found that up to seventy aircraft, the time requirements of the services are observed. Therefore, given equal resource, the implementation of the invention enables a greater number of aircraft to use the resource simultaneously.

The invention claimed is:

1. A method for optimized allocation of a communication resource to transmit messages from first units to a second unit, each of the first units including embedded applications and a terminal for communicating with the second unit, a message being associated with a delay requirement and a size, the method comprising:

receiving, by the terminal, messages originating from the embedded applications and, for each message, of a time reference indicating a time of reception of the message by the terminal;

transmitting, by the terminal, a capacity request for at least one message, the capacity request indicating the size of the message, the delay requirement being associated with the message and the time reference of the message;

receiving, by a control center of the communication resource, the capacity request;

allocating the communication resource to each terminal of the first units by performing a message scheduling calculation based on the time reference and the delay requirement of the messages;

broadcasting, to each terminal of the first units, an allocation plan determined based on the calculated scheduling; and calculating, for each message, a latest transmission time, the latest transmission time of the message being equal to its time of reception by the terminal plus its delay requirement, wherein the messages are scheduled in ascending order of latest transmission time.

2. The method for the optimized allocation of the communication resource of claim 1, further comprising calculating a minimum time to transmit a message by the terminal based on the size of the message, wherein the message scheduling calculation is further based on a minimum message transmission time.

3. The method for the optimized allocation of the communication resource of claim 1, wherein:

each message is associated with a priority, the capacity request indicates priority information associated with the message, the allocating of the communication resource to each terminal of the first units comprises processing requests in order of priority of the associated messages, and the scheduling calculation is performed for messages of equal priority.

4. The method for the optimized allocation of the communication resource of claim 1, wherein the communication resource is subdivided in time into frames identified by numbers, each frame being subdivided in time into slots identified by numbers.

5. The method for the optimized allocation of the communication resource of claim 1, wherein the capacity requests are transmitted without prior reservation of the communication resource.

6. The method for the optimized allocation of the communication resource of claim 4, wherein the capacity requests are transmitted in a dedicated time slot, and each of a plurality of aircraft have a respective time slot dedicated to the transmission of a capacity request.

7. The method for the optimized allocation of the communication resource of claim 1, wherein the time reference is an absolute time.

8. The method for the optimized allocation of the communication resource of claim 1, wherein the time reference is a relative time.

9. The method for the optimized allocation of the communication resource of claim 3, wherein:

the time reference is a relative time, and the relative time comprises a frame number and a slot number.

10. The method for the optimized allocation of the communication resource of claim 1, wherein the communication resource is a satellite communication resource, the first units are aircraft, and the second unit is a ground unit.

11. A communication system for communicating between one or more aircraft and a ground unit using a satellite communication resource to transmit messages from the one or more aircraft to the ground unit, wherein:

each of the one or more aircraft includes embedded applications and a terminal for communicating with the ground unit;

a message is associated with a priority, a delay requirement and a size;

the satellite communication resource is managed by a control center;

each terminal is configured to store a time reference associated with the messages received;

the control center is configured to calculate an allocation plan based on the priorities, the delay requirements and the time references associated with the messages; and the control center is configured to calculate, for each message, a latest transmission time, the latest transmission time of the message being equal to its time of reception by the terminal plus its delay requirement, wherein the messages are scheduled in ascending order of latest transmission time.

* * * * *